Oct. 11, 1966     H. L. BOWDITCH     3,278,942
INDUSTRIAL CHART RECORDER WITH SPECIAL INKING PEN
Filed Sept. 9, 1963     3 Sheets-Sheet 1
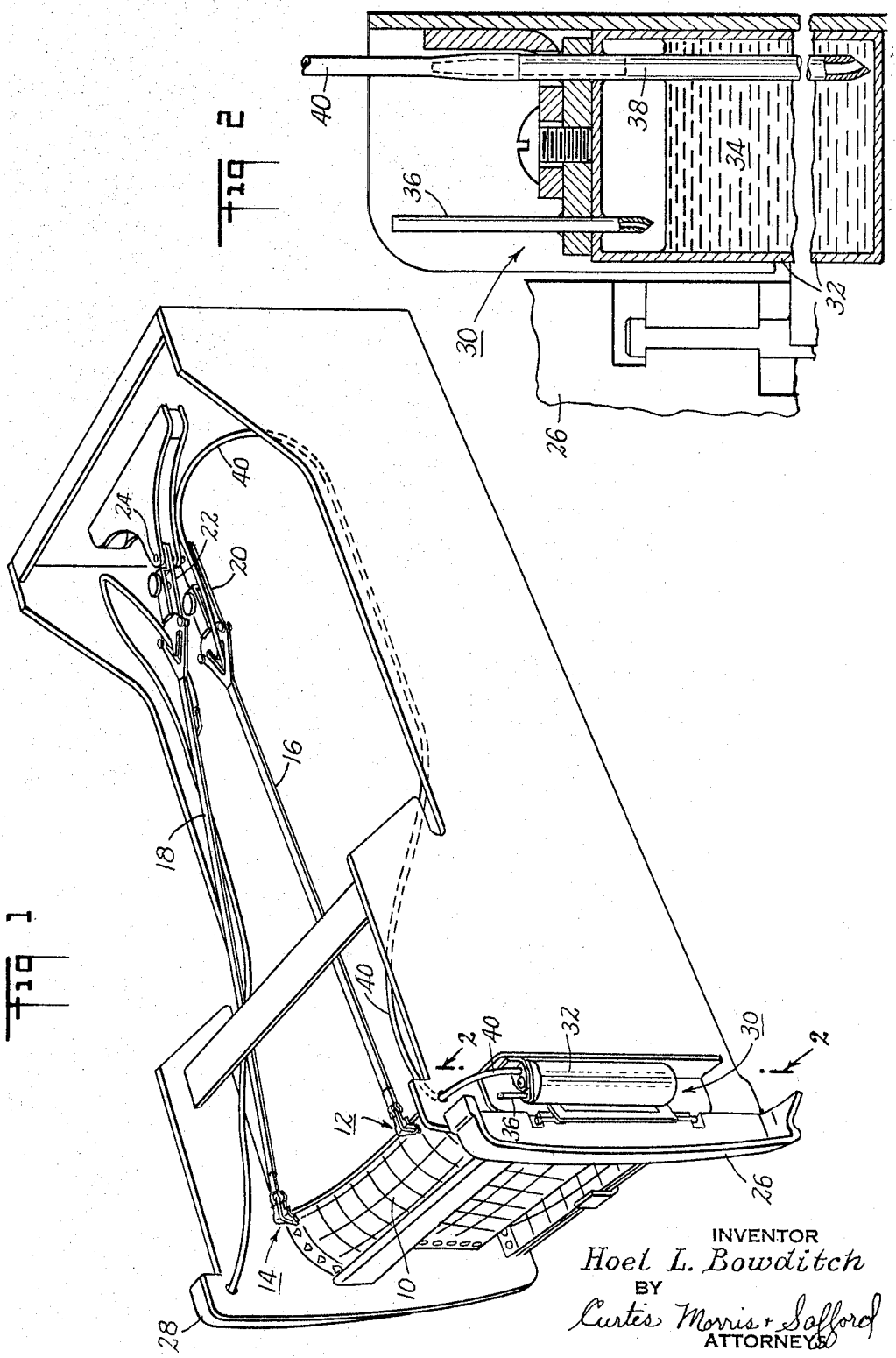
INVENTOR
Hoel L. Bowditch
BY
Curtis, Morris + Safford
ATTORNEYS Oct. 11, 1966 H. L. BOWDITCH 3,278,942
INDUSTRIAL CHART RECORDER WITH SPECIAL INKING PEN
Filed Sept. 9, 1963 3 Sheets-Sheet 2
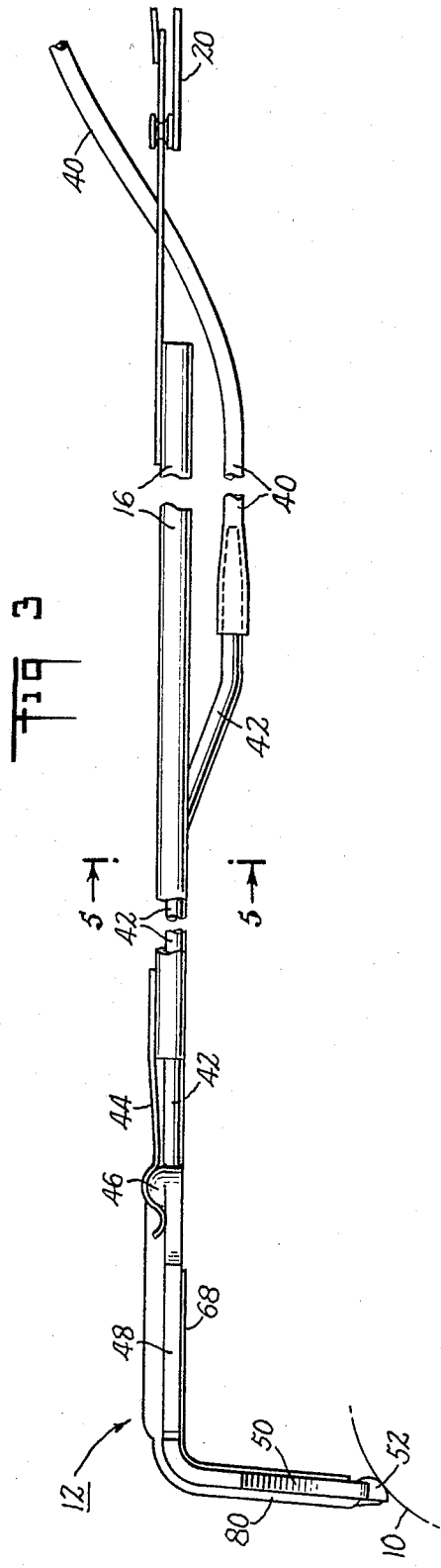
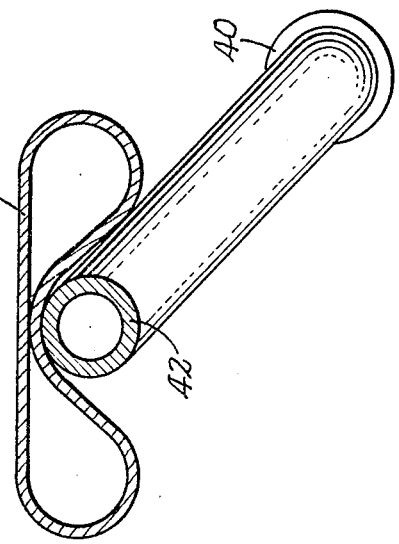
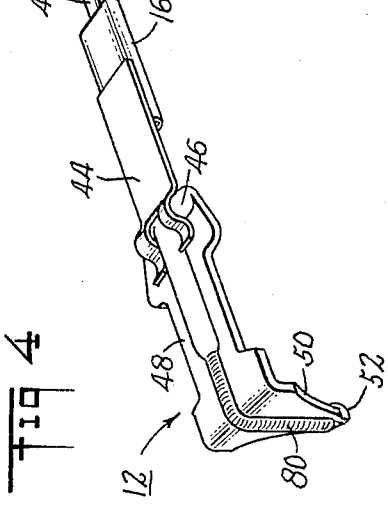
INVENTOR
Hoel L. Bowditch
BY
Curtis, Morris + Safford
ATTORNEYS

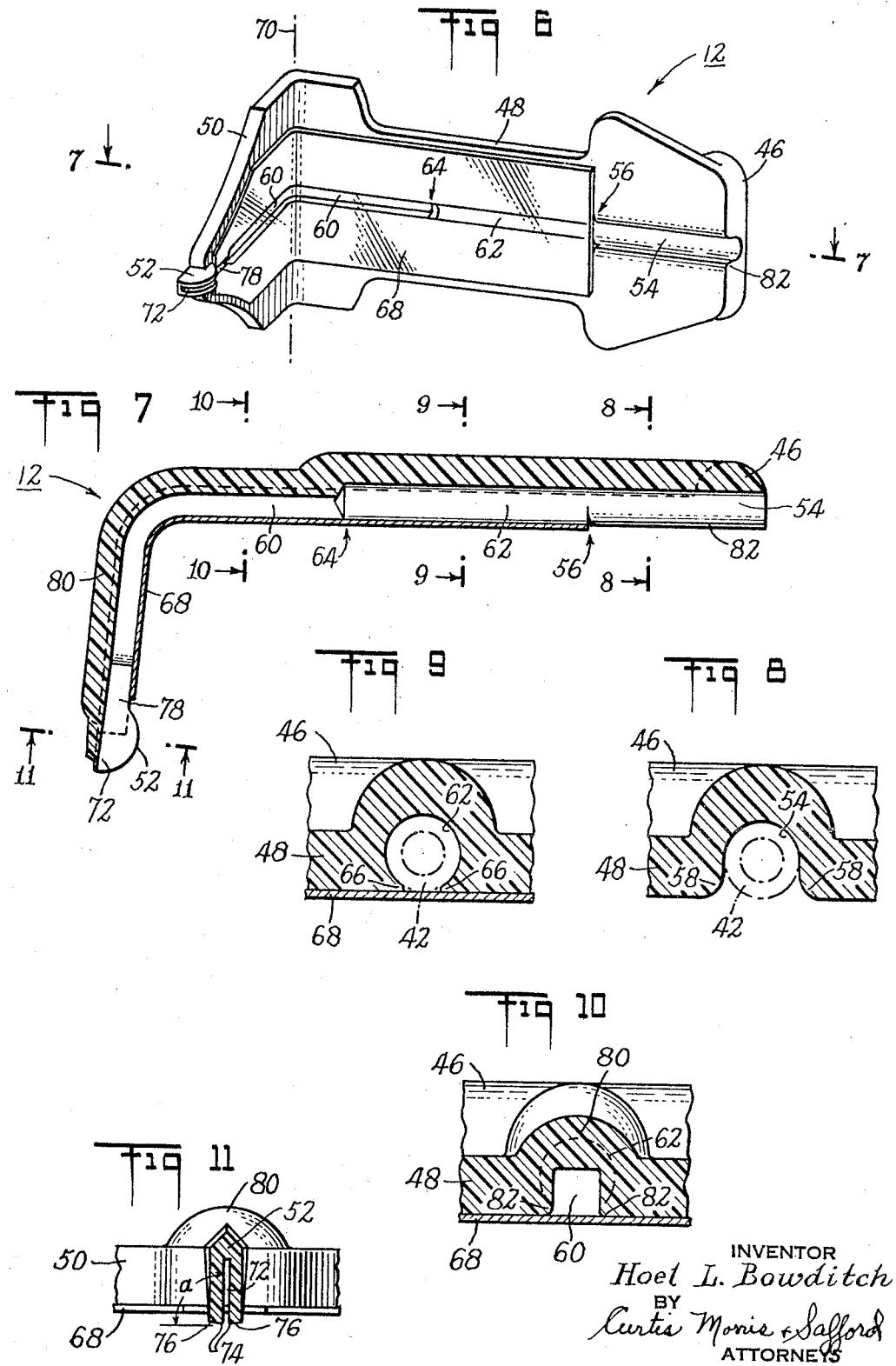

3,278,942
INDUSTRIAL CHART RECORDER WITH SPECIAL
INKING PEN
Hoel L. Bowditch, Foxboro, Mass., assignor to The
Foxboro Company, Foxboro, Mass.
Filed Sept. 9, 1963, Ser. No. 307,409
20 Claims. (Cl. 346—140)

This invention relates to industrial recording instruments of the type adapted to apply ink traces to a moving chart. More in particular, this invention relates to improved inking pens used in such instruments.

For proper operation and control of many industrial processes, it is necessary to provide apparatus for maintaining a continuous record of the magnitude of one or more process conditions such as temperature, flow rate, etc. Typically, this recording function is effected by an instrument having a pen which applies an ink trace to a moving paper chart. Although various recording instruments of this type have been available commercially for many years, these prior instruments have not been entirely satisfactory.

One of the special problems with such prior instruments is that the flow of ink too frequently stops before the ink supply has been exhausted. Since such failure may not be detected for some time, the resulting loss of record may be serious and may cause important economic loss in the operation of the process. A solution of this problem of ink stoppage is made particularly difficult because most such recorders require the use of capillary action to draw the ink a substantial distance up from the ink supply. Thus, there is not available any great pressure to overcome even a mild flow stoppage such as clogging due to dust particles, etc., or drying of the ink at the pen tip.

In an embodiment of the invention described hereinbelow, there is provided an industrial recording instrument having an improved pen made entirely of plastic material. In operation, this pen performs in a highly reliable manner, and maintains by capillary action an essentially continuous flow of ink from an ink supply a substantial distance beneath the pen tip. Preferably, the plastic is translucent to permit the instrument maintenance operator to see the ink in the pen, thereby making it simpler to "prime" the pen without discharging ink drops on to the chart record. Where the recorder includes two or more pens to apply ink of different colors corresponding to different process conditions, the pens may advantageously be formed of plastic which includes a dye to match the corresponding ink trace color.

Accordingly, it is an object of the present invention to provide an industrial recording instrument having an improved pen for applying ink to a chart record. It is a more specific object of this invention to provide an industrial recorder inking pen which is reliable in operation and capable of lifting ink by capillary action a substantial distance from an ink supply. A still further object of this invention is to provide an industrial recorder inking pen which provides improved operational characteristics and yet is economical to manufacture. Other objects, aspects and advantages of this invention will in part be pointed out in, and in part apparent from, the following description considered together with the accompanying drawings, in which:

FIGURE 1 is a perspective view of an industrial recording instrument constructed in accordance with the present invention;

FIGURE 2 is a detail cross-section taken along line 2—2 of FIGURE 1, showing the ink supply for one of the recorder pens;

FIGURE 3 is a side elevation of one of the pens with its supporting arm;

FIGURE 4 is a perspective view showing the top surfaces of the pen;

FIGURE 5 is a cross-section of the pen supporting arm taken along line 5—5 of FIGURE 3;

FIGURE 6 is a perspective view showing the interior adjacent surfaces of the pen;

FIGURE 7 is a longitudinal section taken along line 7—7 of FIGURE 6; and

FIGURES 8 through 11 are cross-sections of the pen taken along the correspondingly-numbered lines of FIGURE 7.

Referring now to FIGURE 1, there is shown an industrial recording instrument including a strip chart record 10 contacted by two pens generally indicated at 12 and 14. These pens apply ink of different colors to the chart record in positions corresponding to the magnitude of different process conditions being measured. Preferably the chart record is of the "folded" type as shown in Bowditch Patent 3,080,561, and is driven down across the front of the instrument at constant speed so as to produce ink traces showing the variations in the measured process conditions over a period of time.

The pens 12 and 14 are mounted on respective supporting arms 16 and 18 which are detachably secured to corresponding brackets 20 and 22 pivoted about a common vertical axis 24. Conventional means (not shown) are provided to position arms 16 and 18 about axis 24 in accordance with the measured process conditions, so that the location of the ink traces placed on the chart by the pens 12 and 14 will correspond to the magnitudes of these process conditions.

The ink supplies for the pens 12 and 14 are located behind the front trim strips 26 and 28 which are hinged to permit ready access. The right-hand strip 26 is shown in opened position to give a full view of the ink supply 30. The other ink supply, which is not shown, is essentially identical to ink supply 30, and therefore the description herein will be directed only to the latter.

Referring now also to FIGURE 2, the ink supply 30 comprises a plastic cylinder 32 containing the ink 34. This cylinder is installed by pressing it up against two slender metal pipes 36 and 38 the lower ends of which pierce the top of the cylinder. The plastic of this cylinder is sufficiently springy that it grips the pipes firmly to hold the cylinder 32 in place and provide an air-tight seal. Pipe 38 conducts the ink out of the container, while pipe 36 serves normally as an air-vent. A conventional flexible squeeze-bulb (not shown) may be connected to the top of pipe 36 to pressurize the container 32 to force ink out through pipe 38 and thereby "prime" the pen 12.

Secured to pipe 38 is a hose 40 which extends towards the rear of the instrument and connects with a metal tube 42 (see FIGURES 3 and 5) spot welded to the underside of the pen supporting arm 16. It also can be seen from FIGURE 5 how the arm 16 is shaped to form two parallel tubular channels on either side of the tube 42. This arrangement provides the desired structural rigidity and yet requires only a relatively small vertical dimension.

The tube 42 extends forwardly beyond arm 16 and into a close-fitting interior channel (to be described in more detail) running along the underside of the pen 12. A spring clip 44 (see also FIGURE 4) is fastened to the arm 16 to engage a transverse rib 46 of the pen and thereby hold the pen securely in its proper position.

Referring now to FIGURES 6 and 7, the plastic pen 12 comprises a shank portion 48 and a pen point portion 50 extending transversely away from the shank portion down to the tip 52. This tip is in the form of a rounded nib to contact and produce an ink trace on the paper chart 10.

The pen 12 preferably is molded initially in flat strip form, i.e. with the shank and pen point portions 48 and 50 lying in the same plane. The mold is so arranged that the shank portion 48 emerges with a generally U-shaped channel 54 (see also FIGURE 8) which extends from the rear of the pen to a transverse plane located at the point identified with the reference numeral 56. This channel is dimensioned to provide a close fit with the tube 42 (indicated in broken outline), and is formed with rounded edges 58 to permit the pen easily to be mounted on the tube with a lateral motion whereby the tube enters the channel 54 from the side rather than being "threaded" through an end opening.

When the flat pen strip emerges from the mold, the U-shaped channel 54 connects, at plane 56, with a smaller rectangular groove 60, the outline of which can be seen in FIGURE 10. However, a rear section 62 of this groove is drilled out between the plane 56 and another transverse plane at the point identified by the reference numeral 64. Referring also to FIGURE 9, this drilled section 62 defines a circular channel having a diameter only a trifle larger than the outer diameter of the tube 42. Thus the pen may be installed on the arm 16 first by the lateral movement referred to above in which the tube 42 is positioned within the U-shaped channel 54, and then by a longitudinal movement in which the pen is shifted rearwards until the circular section 62 surrounds the tube 42.

This longitudinal movement is accomplished without difficulty because the two channels 54 and 62 are aligned, and therefore the tube 42, when in the U-shaped channel 54, also is aligned with the circular channel 62. Since the circular configuration of channel section 62 is greater than 180°, two opposing overhanging lips 66 are formed to hold the tube in place with respect to transverse motion. As mentioned hereinabove, the spring clip 44 holds the pen in place axially. When properly positioned, the end of the tube 42 abuts the transverse wall defining the start of the smaller rectangular groove 60, i.e. the transverse wall at plane 64. Advantageously, the tube 42 fits snugly into the circular channel 62 to provide a sealed passageway for the ink.

After the flat pen strip has been drilled out to form the circular channel section 62 referred to above, a flexible tape 68, e.g. formed of a tough but compressible transparent plastic such as that known as Mylar, is secured to the groove side of the pen as by means of a pressure-sensitive adhesive. This tape is cut to follow the contours of the pen point portion 50, and extends from the U-shaped channel 54 virtually to the curved nib 52. This provides an effectively closed conduit for the passage of ink to the tip of the pen.

After the tape 68 has been affixed, the molded flat pen strip is bent about a transverse axis (identified in FIGURE 6 with reference numeral 70) to form the shank and pen point portions 48 and 50 previously described. To facilitate this bending step, the plastic is heated, at least in the local region where the bending is to take place. The exact location of the bend axis is not critical; indeed, the bend axes of pens 12 and 14 (FIGURE 1) advantageously are located in different positions so that the vertical portion of pen 12 has a smaller height than that of pen 14. With this arrangement, pen 12 can pass beneath pen 14 thereby permitting freely independent motion of the two pens across the face of the chart 10.

The tape 68, or an equivalent form of covering, may be provided after the pen has been bent, but it will be apparent that this step can as a practical matter be carried out more readily while the pen is still in its flat condition.

As shown in FIGURE 11, the rounded nib 52 of the pen consists of a pair of side-by-side members defining an inking slot 72 the interior sides of which are flat and parallel to one another. The edges 74 of this slot are clean and sharp, forming with the chart contacting surfaces 76 an included angle $a$ no greater than 90°, and preferably slightly less than 90°. Thus, if the pen is removed from the chart, the ink within the nib tends to remain at the outer edges of the slot 72, so that the pen will start inking immediately when it is replaced on the chart. Also, with this arrangement it has been found that there is very little tendency for dried ink films to form and clog up the passageways.

The chart-contacting surfaces 76 of the nib 52 are convexly curved, both transversely (i.e. as viewed in the transverse cross-section of FIGURE 11), and also longitudinally (i.e. as viewed in the side elevation of FIGURE 7). The transverse curvature provides for smooth lateral movement of the pen across the face of the chart 10 in response to changes in the measured condition. The longitudinal curvature accommodates smooth movement of the paper chart beneath the pen. This is especially advantageous for use with folder strip chart recorders, since the rounded nib can readily slide up and down the peaks formed by the fold lines, as these lines pass beneath the pen. Moreover, with such a peaked fold line, the point of contact with the rounded nib will shift as the nib climbs up and slides down the sloping areas on either side of the fold line, thereby distributing the wear over a larger area of the nib.

The lateral dimension of the ink slot 72 in nib 52 is approximately 0.003 inch, and preferably between .0025 and .0035 inch. This relatively small opening has been found to provide the required substantial capillary action. That is, the draw due to capillary pressure is sufficient to lift the ink a considerable distance against the force of gravity.

Notwithstanding this small frontal dimension, there is very little tendency for the pen to become plugged with small particles of lint from the paper, or dust or other foreign material in the ink supply, because the longitudinal dimension of the nib opening is substantially larger than the lateral dimension, i.e. at least 10 times larger, and in the preferred embodiment slightly less than 0.1" from end-to-end. In this regard, a self-cleaning action apparently results from the fact that this long dimension of the nib opening is parallel to the movement of the paper chart.

The small lateral dimension of the nib opening is maintained in the short (about $\frac{1}{32}$" long) channel 78 leading from the nib to the rectangular groove channel 60. The rectangular channel has a lateral dimension of about .020", and a depth of about the same magnitude. The circular channel 62 is still larger, having a diameter of about 0.035".

In the preferred embodiment, the plastic from which the pen 12 is molded is polymethylmethacrylate. Such acrylic plastics are available commercially in various formulations, e.g. under the trade marks Lucite or Plexiglas. This plastic has been found to provide a desirable combination of properties, including high resistance to permanent deformation at normal operating temperatures, and dimensional stability even upon absorption of moisture.

Advantageously, the plastic used is transparent, or at least translucent. Thus, the ink in the main channel 60 will be visible to the instrument operator or maintenance man. In addition, the curved ridge 80 over channel 60 preferably is arranged to serve as an optical magnifier to cause the fine line of ink in the channel 60 to stand out more porminently, and thus make the ink easily visible. This view of the ink makes it possible, for example, for the maintenance man to gauge precisely the amount of ink to be forced up during priming, so that the ink is brought just to the nib of the pen without any danger of accidentally discharging a droplet which would smear the paper chart 10.

It has been found that the plastic pen described herein operates in a superior fashion, providing reliable service over long periods of use. In part, this may be due to the superior "wetting" action resulting from the use of plastic as the material from which the pen is constructed. The excellent results also surely are due in some degree to the particular configuration of the nib 52 discussed above, as well as the dimensions selected. Beyond this, it has been found, however, that this pen apparently is less affected by stoppages resulting from the formation of air bubbles within the ink passageways. This result may be due to the generally rectangular cross-section of channel 60, since an air bubble tends to take a circular or nearly circular shape, and thus the rectangular passage leaves small corner openings around the air bubble through which ink can pass. Also, the resistance to air-bubble stoppages may possibly be due in part to the slightly rounded channel edges 82 (FIGURE 10) which similarly create bypass channels of noncircular configuration through which ink can pass around an air bubble. A still further advantage of the disclosed construction is that the translucent quality of the plastic permits the air bubbles to be seen by the operator, who can then take steps to flush the bubble out of the system.

Although a preferred embodiment of the invention has been set forth in detail, it is desired to emphasize that this is not intended to be exhaustive or necessarily limitative; on the contrary, the showing herein is for the purpose of illustrating the invention and thus enable others skilled in the art to adapt the invention in such ways as meet the requirements of particular applications, it being understood that various modifications may be made without departing from the scope of the invention as limited by the prior art.

I claim:

1. An industrial recording instrument comprising an ink-receptive chart supported for movement; a pen having an ink groove in one surface thereof, a capillary inking nib integral with said pen and adapted to contact said chart, said pen including said inking nib being formed wholly of moldable plastic; means covering said ink groove to form a closed passageway; means for moving said pen arross the face of said chart to position said pen in accordance with a measured process condition; an ink supply; and means connecting said ink supply to said closed passageway.

2. An industrial recording instrument comprising an ink-receptive chart supported for movement at a constant speed; a pen having an ink channel therein leading to an inking tip adapted to contact said chart, said pen with said inking tip being formed wholly of a translucent moldable plastic through which ink in said channel will be visible, said pen further including a curved element disposed adjacent said ink channel to serve as an optical magnifier and cause the ink in said channel to stand out more prominently; and means for moving said pen across the face of said chart so that the positioning thereof corresponds to a measured process condition.

3. Apparatus as claimed in claim 2, wherein said channel extends in a straight line longitudinally along said pen, said curved element consisting of a plastic ridge running parallel to said channel, said ridge being convex when viewed in cross-section.

4. A pen for use with an industrial recording instrument and comprising: a shank portion adapted to be connected at one end to a pen supporting arm, a pen point portion extending transversely away from the other end of said shank portion, said shank and point portions being integral and formed of plastic material, said pen point portion having a groove formed in the interior surface thereof facing said shank portion and extending from said shank portion to the tip of said pen, means covering said groove to form an enclosed channel between said shank portion and said pen tip, and ink supply means for furnishing ink to said groove.

5. A pen as claimed in claim 4, wherein said covering means comprises a strip of tape laid over said groove.

6. A pen as claimed in claim 5, wherein said tape is secured to said pen by pressure-sensitive adhesive.

7. For use with an industrial recording instrument, a one-piece plastic pen having a shank portion adapted to be connected at one end to a pen supporting arm and an integral pen point portion extending transversely away from the other end of said shank portion, said pen point portion having a chart-contacting tip at the extremity thereof, said pen point and shank portions being formed with a continuous groove in the interior adjacent surfaces thereof, said groove extending from said one shank portion end to said chart-contacting tip, and ink supply means for furnishing ink to said groove.

8. A pen as claimed in claim 7, including a strip of tape overlying said groove from a region of said shank portion to said chart-contacting tip to provide a closed passageway for said ink.

9. A pen as claimed in claim 7, wherein said groove in said shank portion includes a straight section which, when viewed in cross-scetion, presents a circular configuration having an arc greater than 180° and is adapted to receive a rigid tube of said pen supporting arm on which the pen is mounted.

10. A pen as claimed in claim 9, wherein said shank portion includes a second straight section of said groove between the first section and said one end, said second seciton having a U-shaped cross-section and being aligned with said first section, the lateral width at the open side of said second section being at least equal to the diameter of said tube, whereby said tube can be seated in said second section by a lateral motion of said pen, and said pen can thereafter be secured in place by a longitudinal sliding movement to position said tube in said first section of said groove.

11. A pen as claimed in claim 10, including means covering said groove from said tip to said groove section, said second groove section being exposed.

12. In an industrial recording instrument of the type comprising a chart record mounted for continuous movement and an inking pen having an inking nib at one end thereof maintained in engagement with the surface of said chart record, and wherein said pen is mounted for movement across the face of said chart record to apply thereto a continuous ink trace indicating the magnitude of a variable condition: that improvement in said instrument wherein said pen is formed with a closed non-circular ink supply channel connected to said inking nib and through which ink flows continuously to form said trace on said chart, the interior walls of said channel having at least two surfaces which intersect at a sharp edge presenting a surface discontinuity as viewed in cross-section, thereby to minimize the effect of air bubbles on the flow of ink through the channel.

13. Apparatus as claimed in claim 12, wherein said channel is rectangular as viewed in cross-section.

14. Apparatus as claimed in claim 13, wherein said channel consists of a rectangular groove formed in one surface of said pen, a flat member covering the open side of said groove to form the closed channel.

15. Apparatus as claimed in claim 14, wherein said member consists of a strip of tape secured to the body of said pen, the edges of said groove being rounded to form crevice-like passageways between said pen body and said tape.

16. Apparatus as claimed in claim 12, wherein said ink supply channel consists of a groove formed in one surface of said pen with a closed member covering the open side thereof, at least one edge of said groove being rounded to form a crevice-like passageway between said member and said pen body.

17. An industrial recording instrument comprising an ink-receptive chart supported for movement parallel to the surface thereof; a pen mounted adjacent said chart and having an ink passage therein leading to an inking tip positioned to contact said chart, said inking tip including a nib of plastic material molded to form a pair of side-by-side members providing two chart-contacting surfaces with an elongate capillary inking slot therebetween, said chart-contacting surfaces being convexly curved in a longitudinal direction and having a width which is substantial relative to the width of said slot, each of said chart-contacting surfaces and the respective adjacent surface interiorly of said slot intersecting at a sharp edge at the opening of said slot; means for moving said pen across the face of said chart to position the pen in accordance with a measured process condition; an ink supply; and means connecting said ink supply to said ink passage.

18. Apparatus as claimed in claim 17, wherein said chart-contacting surfaces have a width greater than the width of said slot, said sharp edge of surface intersection defining an included angle no greater than 90°, said chart-contacting surfaces being slightly curved convexly, as viewed in cross-section, to assure smooth travel thereof laterally across the chart.

19. A pen for use with an industrial recording instrument of the type including a movable chart record, said pen comprising a shank portion adapted to be connected at one end to a pen supporting arm; a plastic pen point portion at the other end of said shank portion; an inking nib forming part of said plastic pen point portion, said inking nib comprising a channel structure defining an inking channel having an elongate ink-dispensing opening along one side and being closed on its other sides by wall means including a pair of relatively rigid side walls and a bottom wall, said side walls being spaced from each other along the opposite sides of said elongate opening, the exposed end surfaces of said two side walls being coextensive with said elongate opening of said channel and serving as chart-contacting surfaces to engage said chart record to expose the chart record to the ink at said elongate opening and apply ink to said chart record, the longitudinal dimension of said channel extending in a direction generally parallel to the direction of movement of said chart record whereby the chart record surface is contacted by the ink along a strip having the width of said longitudinal opening and for a length sufficient to permit the ink to be drawn from said channel; and means forming an ink supply passage connected at one end to said channel and extending therefrom to said shank portion to continuously replenish the ink in said channel.

20. An industrial recording instrument comprising an ink-receptive chart supported for movement parallel to its surface and having at least a section thereof positioned for viewing by an operator; a pen mounted adjacent said chart to apply an ink trace to said viewing section; said pen including a shank portion and a pen point portion having an inking tip at one end and an internal closed ink supply passage connecting said tip with said shank portion, said passage having a width substantially smaller than its length, said pen point portion being formed of translucent plastic material permitting ink in said passage to be visible from the exterior, said pen point portion being positioned with said ink supply passage extending in a direction to permit the operator readily to determine whether there is ink continuity through said passage to said inking tip.

References Cited by the Examiner

UNITED STATES PATENTS

| | | | |
|---|---|---|---|
| 1,683,828 | 9/1928 | Ireland | 120—42.06 |
| 1,789,137 | 1/1931 | Fitch | 29—445 |
| 1,895,727 | 1/1933 | Pearce | 120—42.06 |
| 2,012,736 | 8/1935 | Taylor | 346—146 X |
| 2,063,458 | 12/1936 | Nome | 120—42.06 |
| 2,082,591 | 6/1937 | Newman | 346—140 X |
| 2,243,932 | 6/1941 | Wery et al. | 29—445 |
| 2,727,802 | 12/1955 | Bowditch | 346—140 |
| 2,752,220 | 6/1956 | Squier | 346—140 |
| 2,804,681 | 9/1957 | Brueckner | 29—159.2 |
| 3,083,689 | 4/1963 | Hegener | 120—42.06 |
| 3,090,357 | 5/1963 | Gauley | 120—42.06 |
| 3,094,104 | 6/1963 | Gauley | 120—42.06 |
| 3,096,742 | 7/1963 | Gill et al. | 120—42.06 |
| 3,102,770 | 9/1963 | McKeegan | 346—140 |
| 3,116,964 | 1/1964 | Zenner | 346—140 |
| 3,120,214 | 2/1964 | Stegenga | 120—42.06 |
| 3,120,215 | 2/1964 | Scalo et al. | 120—42.06 |
| 3,150,915 | 9/1964 | Dixon et al. | 346—140 |
| 3,165,827 | 1/1965 | Stollman | 29—445 |

RICHARD B. WILKINSON, *Primary Examiner.*

LEYLAND MARTIN, LEO SMILOW, *Examiners.*

JOSEPH W. HARTARY, *Assistant Examiner.*